(12) United States Patent
Shock et al.

(10) Patent No.: US 11,493,174 B2
(45) Date of Patent: Nov. 8, 2022

(54) PREACTIVATED, BATCH FIREABLE GETTER WITH INTEGRATED, MINIATURE, SINGLE-ACTUATION, EXTREMELY HIGH-TEMPERATURE BAKEABLE VALVE

(71) Applicant: RAYTHEON COMPANY, Waltham, MA (US)

(72) Inventors: Cliff L. Shock, Arroyo Grande, CA (US); Michael A. Feeley, Santa Barbara, CA (US); John Kenneth Venezia, Forney, CA (US)

(73) Assignee: RAYTHEON COMPANY, Waltham, MA (US)

( * ) Notice: Subject to any disclaimer, the term of this patent is extended or adjusted under 35 U.S.C. 154(b) by 134 days.

(21) Appl. No.: 17/064,966

(22) Filed: Oct. 7, 2020

(65) Prior Publication Data

US 2022/0107055 A1    Apr. 7, 2022

(51) Int. Cl.
| | |
|---|---|
| *F17C 3/08* | (2006.01) |
| *B29C 45/14* | (2006.01) |
| *B29C 33/12* | (2006.01) |
| *B29K 23/00* | (2006.01) |
| *B29K 623/00* | (2006.01) |

(52) U.S. Cl.
CPC .............. *F17C 3/08* (2013.01); *B29C 33/12* (2013.01); *B29C 45/14065* (2013.01); *B29C 45/14688* (2013.01); *B29K 2023/12* (2013.01); *B29K 2623/12* (2013.01); *F17C 2203/0395* (2013.01); *F17C 2203/0629* (2013.01)

(58) Field of Classification Search
CPC .............. F17C 3/08; F17C 2203/0395; F17C 2203/0629; F17C 1/12; F17C 3/085; F17C 2203/0631
See application file for complete search history.

(56) References Cited

U.S. PATENT DOCUMENTS

| | | | |
|---|---|---|---|
| 4,920,270 A * | 4/1990 | Grodzins | ............... G01T 1/178 250/DIG. 2 |
| 5,111,049 A | 5/1992 | Romano et al. | |
| 6,822,880 B2 | 11/2004 | Kovacs et al. | |
| 8,796,598 B2 | 8/2014 | England et al. | |
| 2008/0027422 A1 | 1/2008 | Vancelette et al. | |

FOREIGN PATENT DOCUMENTS

| | | |
|---|---|---|
| CA | 1322273 C | 9/1993 |
| WO | 2014099123 A1 | 6/2014 |

* cited by examiner

*Primary Examiner* — Stephen J Castellano
(74) *Attorney, Agent, or Firm* — Cantor Colburn LLP

(57) ABSTRACT

A getter assembly is provided and includes a first canister, an internal can including getter, and a second canister. The internal can is disposable in the first canister to occupy a first position at which the getter is hermetically sealable and second positions at which the getter is exposed to an exterior environment. The second canister is engageable with the first canister to drive movements of the internal can between the first position and the second positions following activation and hermetic sealing of the getter.

16 Claims, 3 Drawing Sheets

PREACTIVATED, BATCH FIREABLE GETTER WITH INTEGRATED, MINIATURE, SINGLE-ACTUATION, EXTREMELY HIGH-TEMPERATURE BAKEABLE VALVE

BACKGROUND

The present disclosure relates to getters and, in particular, to a preactivated, batch-fireable getter with integrated, miniature, single-actuation, extremely high-temperature bakeable valve.

Infrared detector dewars often utilize getters. Getters are components of in-situ vacuum pumps and serve to maintain a dewar vacuum during a specified operating lifetime. In certain cases, dewars utilize a getter can that is packed with non-evaporable (NEG) getter material. The getter can is welded to a getter adapter that is brazed to the dewar body. In these or other cases, the getter is activated utilizing a coiled cable heater which heats the can to a high-temperature (750° C. to 900° C.) for an extended period.

When the getter is activated, relatively heavy scale forms on the getter can during the high-temperature activation processes. This heavy scale is then removed via a labor-intensive abrasive removal operation. The getter is subsequently encapsulated to prevent foreign object debris (FOD) generation in the imaging system.

SUMMARY

According to an aspect of the disclosure, a getter assembly is provided and includes a first canister, an internal can including getter and a second canister. The internal can is disposable in the first canister to occupy a first position at which the getter is hermetically sealable and second positions at which the getter is exposed to an exterior environment. The second canister is coupled with the internal can and engageable with the first canister to drive movements of the internal can between the first position and the second positions following activation and hermetic sealing of the getter.

In accordance with additional or alternative embodiments, the activation of the getter is accomplished by an activation soak at elevated temperatures.

In accordance with additional or alternative embodiments, the second canister is threadably engageable with the first canister and a turn of the second canister about the first canister drives movement of the internal can from the first position to the second positions.

In accordance with additional or alternative embodiments, the internal can includes a base, an inner wall that extends from the base to be supportive of the getter material and a deformable outer wall that extends from the base and includes a distal end secured to the first canister.

In accordance with additional or alternative embodiments, the deformable outer wall includes at least one of bellows and corrugations.

In accordance with additional or alternative embodiments, the second canister includes an internally threaded sidewall to engage with exterior threading of the first canister and a flange that extends inwardly from the internally threaded sidewall for coupling with the internal can.

According to an aspect of the disclosure, a getter assembly is provided and includes a first canister having a valve opening, an internal can including a valve element, getter, vents and braze alloy and a second canister. The internal can is disposable in the first canister to occupy a first position at which the valve element closes the valve opening to be positioned to hermetically seal the getter with the braze alloy melted into the vents and second positions at which the valve element is displaced from the valve opening to expose the getter to an exterior environment via the valve opening. The second canister is coupled with the internal can and engageable with the first canister to drive movements of the internal can between the first position and the second positions following activation of the getter and a melting of the braze alloy into the vents.

In accordance with additional or alternative embodiments, the activation of the getter is accomplished by an activation soak at elevated temperatures and the melting of the braze alloy is accomplished by a brief thermal excursion above a melting point of the braze alloy.

In accordance with additional or alternative embodiments, the first canister includes a copper valve seat at the valve opening.

In accordance with additional or alternative embodiments, the second canister is threadably engageable with the first canister and a turn of the second canister about the first canister drives movement of the internal can from the first position to the second positions.

In accordance with additional or alternative embodiments, the internal can includes a base defining the vents, an inner wall that extends from the base to be supportive of the getter and the valve element and a deformable outer wall that extends from the base and includes a distal end secured to the first canister.

In accordance with additional or alternative embodiments, the deformable outer wall includes stainless steel.

In accordance with additional or alternative embodiments, the deformable outer wall includes at least one of bellows and corrugations.

In accordance with additional or alternative embodiments, the valve element includes a sapphire half-ball lens.

In accordance with additional or alternative embodiments, the second canister includes an internally threaded sidewall to engage with exterior threading of the first canister and a flange that extends inwardly from the internally threaded sidewall for coupling with the internal can.

According to an aspect of the disclosure, a dewar is provided and includes a getter assembly for maintaining a dewar vacuum during an operating lifetime.

According to an aspect of the disclosure, a method of preparing getter assemblies for installation into a dewar is provided. Each of the getter assemblies includes a valve, getter, vent holes and braze alloy. The method includes placing the getter assemblies in a furnace with the respective valves closed and the respective vent holes open and evacuating the furnace. With the getter assemblies placed in the furnace and the furnace evacuated, the method further includes executing an activation soak of the getter assemblies to activate the respective getters and executing a brief thermal excursion of the getter assemblies to cause the respective braze alloys to melt and flow into the respective vent holes to thereby hermetically seal the respective getters.

In accordance with additional or alternative embodiments, the activation soak includes an exposure of the getter assemblies to temperatures of about 750° C.-900° C. for an extended time and the brief thermal excursion immediately follows the activation soak and includes an exposure of the getter assemblies to temperatures of about 950° C. for a brief time.

In accordance with additional or alternative embodiments, the method further includes installing one or more of the getter assemblies onto the dewar and opening the respective valves of the one or more of the getter assemblies to generate and maintain a dewar vacuum in the dewar.

In accordance with additional or alternative embodiments, the opening of the respective valves of the one or more of the getter assemblies includes a single actuation.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As will be described below, a getter assembly is provided for use with infrared (IR) detector dewars or other products requiring a vacuum environment. The getter assembly is pre-fireable in large batches of potentially hundreds at a time with each getter assembly being activated and hermetically sealed in a vacuum furnace through a novel activation/brazing operation. Each getter assembly includes an integrated, extremely high-temperature bakeable (to 900° C. or higher), single-actuation valve. Each getter assembly can eventually be welded onto a detector dewar in the sealed state and rides through the build process through final vacuum bake processing. The single-actuation valve can be opened to expose getter to dewar internals with, e.g., a quarter turn of a wrench.

Figure 1:
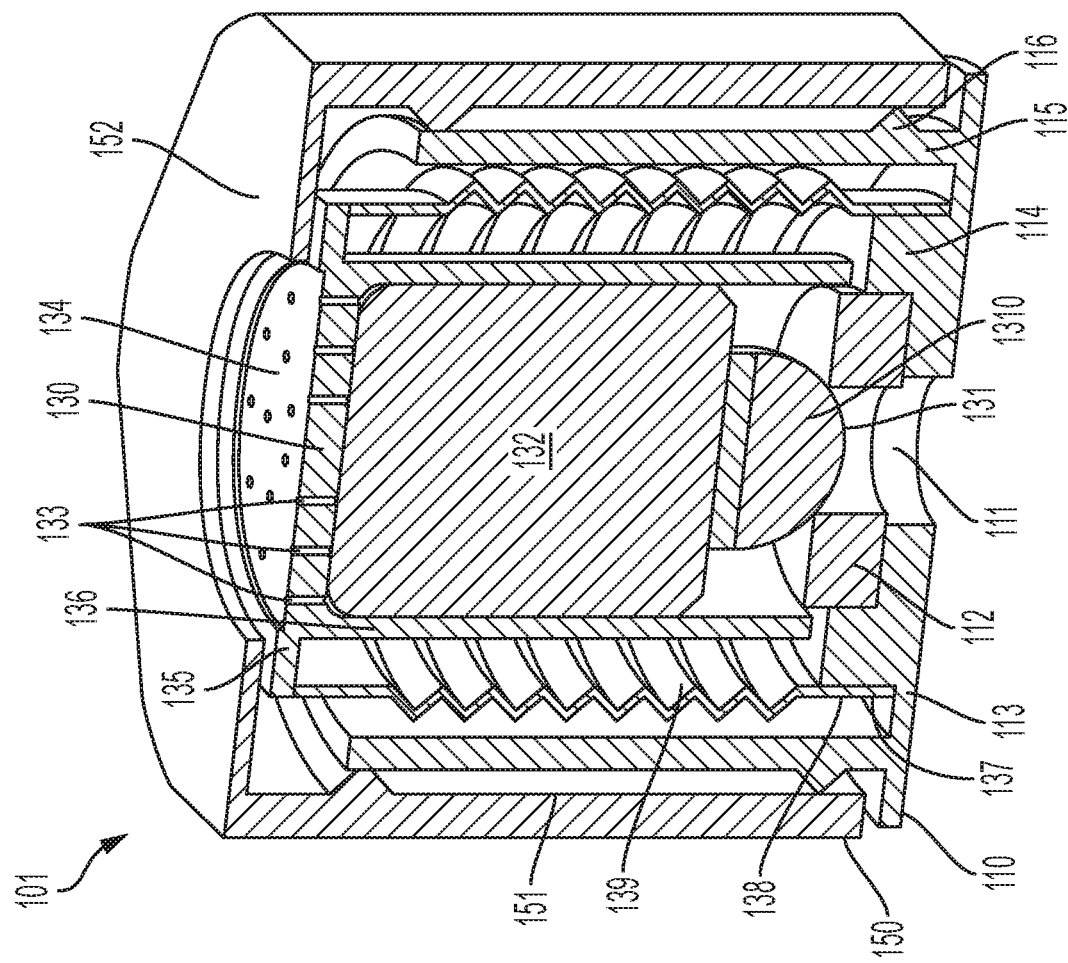
FIG. 1 is a cutaway perspective view of a getter assembly in accordance with embodiments.

With reference to FIG. 1, a getter assembly 101 is provided and includes a first canister 110, an internal can 130 and a second canister 150. The first canister 110 has a valve opening 111 and includes a copper valve seat 112 at the valve opening 111. The internal can 130 includes a valve element 131, getter 132, an array of vents 133 and braze alloy 134. The internal can 130 is disposable in the first canister 110 to occupy a first position and second positions. The first position is characterized in that the valve element 131 is seated on the copper valve seat 112 to close the valve opening 111 and to thereby hermetically seal the getter 132 inside the internal can 130 with the braze alloy 134 having been melted and flown into the vents 133. The second positions are characterized in that the valve element 131 is displaced from the copper valve seat 112 to thereby expose the getter 132 to an exterior environment via the valve opening 111. The second canister 150 can be coupled to the internal can 130 and is engageable with the first canister 110 to drive movements of the internal can 130 relative to the first canister 110.

During an assembly and pre-firing operation, the second canister 150 is engageable with the first canister 110 to maintain the internal can 130 in the first position during an activation of the getter 132 and a melting of the braze alloy 134 into the vents 133 so that the activated getter 132 is hermetically sealed. Subsequently, in an operational setting (i.e., where the getter assembly 101 is operably attached to a dewar), the second canister 150 is engageable with the first canister 110 to drive movements of the internal can 130 from the first position to the second positions. These movements cause the valve element 131 to be displaced from the copper valve seat 112. This opens the valve opening 111 and, in the case of the getter assembly 101 being operably attached to a dewar, exposes the activated getter 132 to dewar internals. The activated getter 132 draws gases from the dewar internals and thereby serves to maintain a vacuum in the dewar internals.

As shown in FIG. 1, the first canister 110 includes a plate element 113, which is formed to define the valve opening 111 in a center thereof and to which the copper valve seat 112 is attached, a boss 114 that extends away from the plate element 113 and an outer wall 115 that extends away from the plate element 113. An exterior facing surface of the outer wall 115 includes exterior threading 116. The internal can 130 includes a base 135 that is formed to define the vents 133, an inner wall 136 that extends from the base 135 to be supportive of the getter 132 and the valve element 131 and a deformable outer wall 137. The getter 132 is affixed to an interior facing surface of the inner wall 136 and the base 135. The braze alloy 134 is initially disposed on the base 135 so that the braze alloy 134 can flow into the vents 133 and toward the getter 132 once the braze alloy 134 is melted. The deformable outer wall 137 extends from the base 135 and includes a distal end 138. The distal end 138 can be secured to the boss 114 of the first canister 110 so that the getter 132 can be hermetically sealed inside the internal can 130 with the braze alloy 134 having been melted into the vents 133. The deformable outer wall 137 includes at least one of bellows 139 and corrugations to absorb the movement of the internal can 130 between the first position and the second positions (and, in some though not all cases, to bias the internal can 130 toward occupying the second positions). The second canister 150 includes an internally threaded sidewall 151 and a flange 152. The internally threaded sidewall 151 is configured to engage with the exterior threading 116 of the outer wall 115 of the first canister 110. The flange 152 extends inwardly from the internally threaded sidewall 151. The flange 152 can be coupled with the base 135 of the internal can 130 and, in any case, serves to impinge on the base 135 of the internal can 130.

With the second canister 150 threadably engaged with the first canister 110, a forward turn of the second canister 150 about the first canister 110 draws the second canister 150 toward the first canister 110. The flange 152 is coupled with and thus abuts with the base 135 and drives movement of the internal can 130 toward the first position whereupon the at least one of bellows 139 and corrugations can be somewhat compressed and the valve element 131 is seated on the copper valve seat 112 to close the valve opening 111. A reverse turn of the second canister 150 about the first canister 110 draws the second canister 150 away from the first canister 110. The at least one of bellows 139 and corrugations are decompressed and the internal can 130 is driven by the second canister 150 from the first position and toward the second positions whereupon the valve element 131 is displaced from the copper valve seat 112 to open the valve opening 111. Thus, the valve opening 111 can be closed or opened with a single-actuation action.

The valve element 131 can include or be provided as a sapphire half-ball lens 1310 and a stem tip. At least the deformable outer wall 137 can include stainless steel or another similar material.

Figure 2:
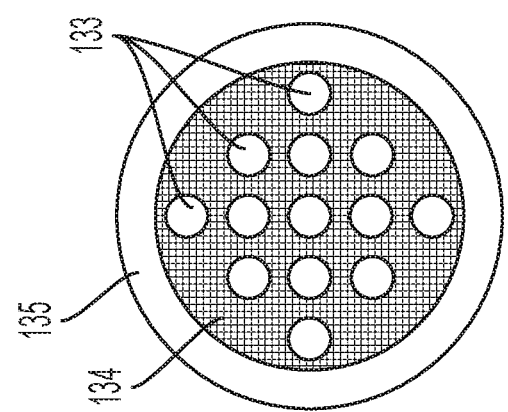
FIG. 2 is an axial view of vents and braze alloy of the getter assembly of FIG. 1 in accordance with embodiments.

With reference to FIG. 2, the vents 133 can be provided in a square array or lattice or in any other suitable arrangement or formation. The braze alloy 134 can be provided on the base 135 in a manner that does not block the vents 133 at least until the braze alloy 134 is melted. In this way, as gasses can be drawn out of the getter 132 during the activation of the getter 132 and through the vents 133. Subsequently, once the activation of the getter 132 is completed and the braze alloy 134 is melted and flown into the vents 133, the braze alloy 134 prevents gas flow through the vents 133.

Figure 3:
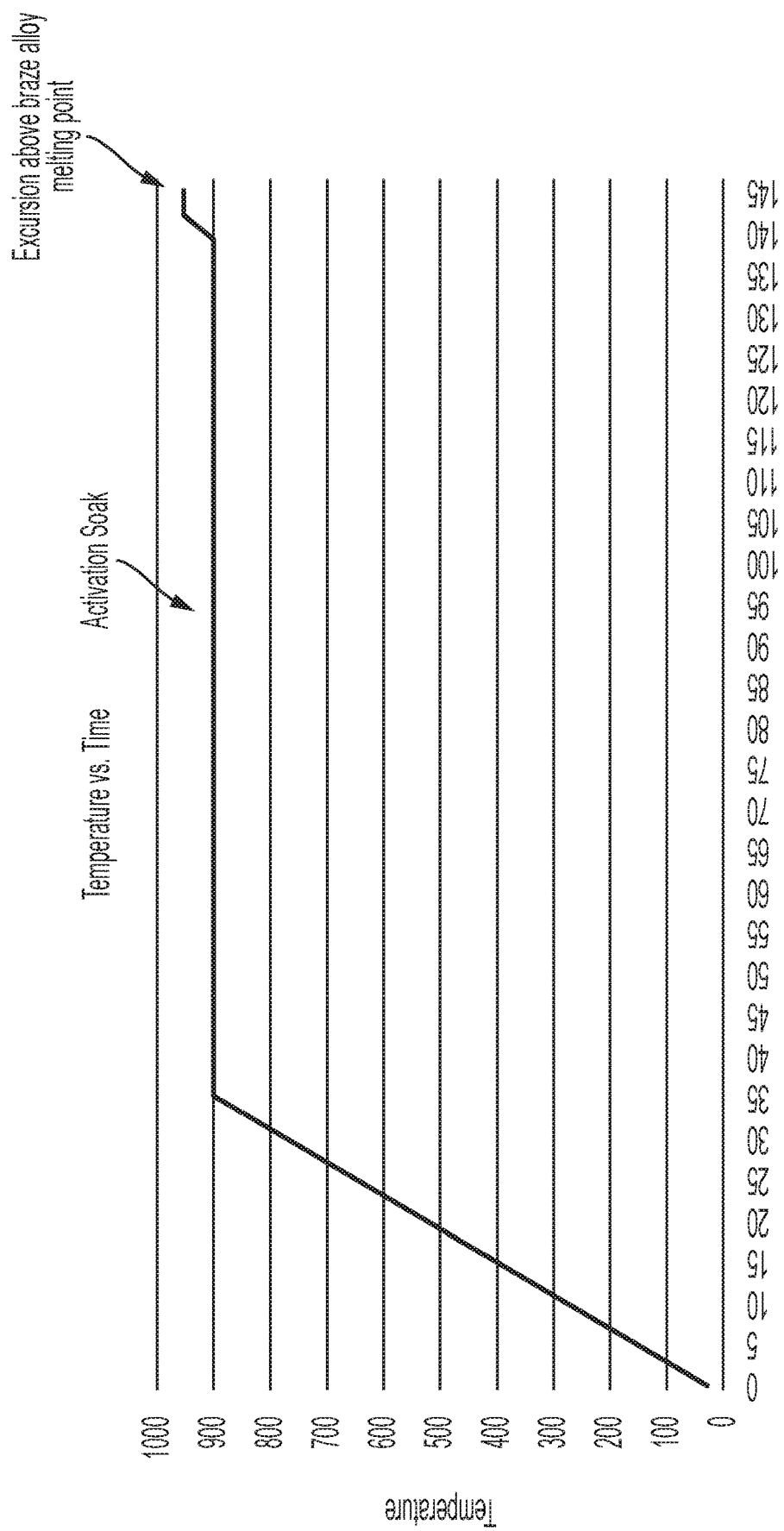
FIG. 3 is a graphical illustration of activation of getter and melting of braze alloy of the getter assembly of FIG. 1 in accordance with embodiments.

With reference to FIG. 3, the activation of the getter 132 is conducted within an evacuated furnace and is accomplished by an activation soak at elevated temperatures (e.g., about 750° C.-900° C.) for or an extended period of time. With continued reference to FIG. 3, the melting of the braze alloy 134 is accomplished by a brief thermal excursion above a melting point of the braze alloy 134 (e.g., about 950° C.) for a brief period of time that is substantially shorter than the extended period of time. This series of thermal operations is illustrated in FIG. 3.

Figure 4:
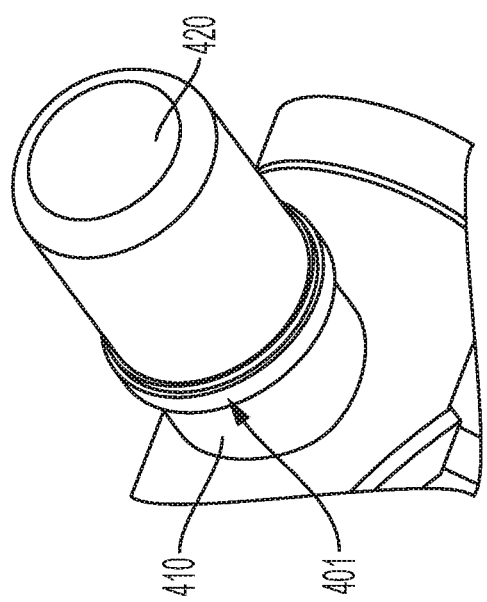
FIG. 4 is a perspective view of a dewar including the getter assembly of FIG. 1 in accordance with embodiments.

With continued reference to FIGS. 1-3 and with additional reference to FIG. 4, a dewar 401 is provided. The dewar 401 can be provided as an infrared (IR) dewar, though it is to be understood that this is not required, and includes a detector body 410 and a getter assembly 420 as described above with reference to FIGS. 1-3. During an operation of the dewar 401, the dewar assembly 420, which is welded or otherwise attached to the detector body 410, maintains a dewar vacuum in the detector body 410 of the dewar 401 during an operating lifetime thereof. More particularly, during the operation of the dewar 401, the dewar assembly 420 is welded or otherwise attached to the detector body 410 with the getter 132 activated and hermetically sealed. Subsequently, the second canister 150 of the dewar assembly 420 is turned relative to the first canister 110. This opens the valve opening 111 and exposes the activated getter 132 to the internals of the detector body 410. The activated getter 132 thus draws gasses from the internals of the detector body 410 and thereby maintains a dewar vacuum in the detector body 410 during the operating lifetime thereof.

Figure 5:
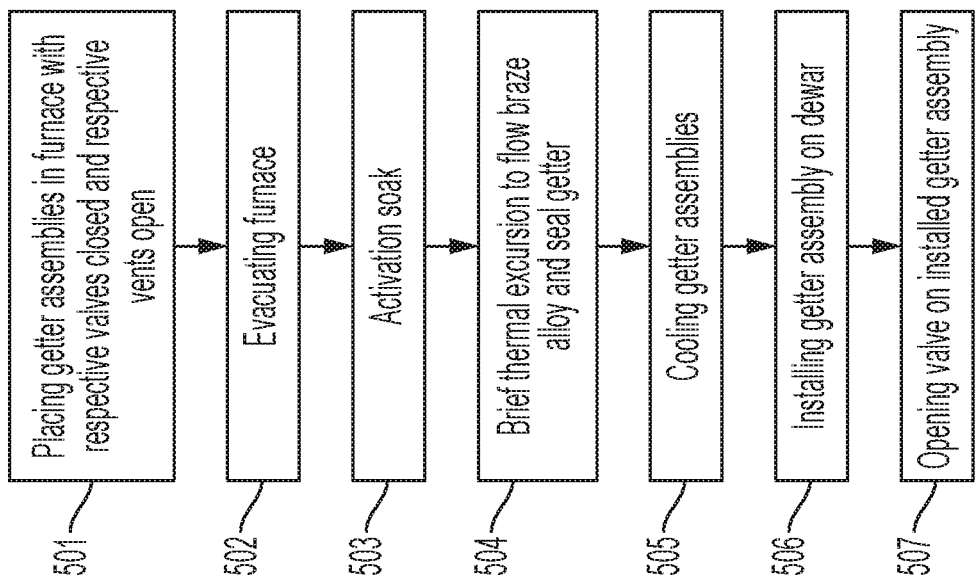
FIG. 5 is a flow diagram illustrating a method of preparing getter assemblies for installation into a dewar in accordance with embodiments.

With reference to FIG. 5, a method of preparing getter assemblies for installation into a dewar is provided. As described above, each of the getter assemblies includes a valve, getter, vents and braze alloy. As shown in FIG. 5, the method includes placing the getter assemblies (possibly tens, hundreds or thousands of getter assemblies) in a furnace with the respective valves closed and the respective vents open 501 and evacuating the furnace 502. With the getter assemblies placed in the furnace and the furnace evacuated, the method further includes executing an activation soak of the getter assemblies to activate the respective getters 503 and executing a brief thermal excursion of the getter assemblies to cause the respective braze alloys to melt and flow into the respective vents to thereby hermetically seal the respective getters 504.

In accordance with embodiments, the activation soak of operation 503 includes an exposure of the getter assemblies to temperatures of about 750° C.-900° C. for an extended period of time and the brief thermal excursion of operation 504 immediately follows the activation soak and includes an exposure of the getter assemblies to temperatures of about 950° C. for a brief period of time that is substantially shorter than the extended period of time.

In accordance with additional embodiments, the method can also include cooling the getter assemblies 505 so that the getter assemblies 505 can be manipulated. Once the getter assemblies are cooled, the method can further include installing one or more of the getter assemblies onto the dewar 506 and opening the respective valves of the one or more of the getter assemblies to generate and maintain a dewar vacuum in the dewar 507.

At least the opening of the respective valves of the one or more of the getter assemblies of operation 507 includes a single actuation.

Technical effects and benefits of the present disclosure are the provision of getter assembly that eliminates about 95% of the hours per unit currently associated with getter activation, reduces cycle time through the final vacuum bake process by about 15% and eliminates the need for getter descaling and encapsulation.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. A getter assembly, comprising:
   a first canister;
   an internal can comprising getter,
   the internal can being disposable in the first canister to occupy a first position at which the getter is hermetically sealable and second positions at which the getter is exposed to an exterior environment; and
   a second canister which is coupled with the internal can and engageable with the first canister to drive movements of the internal can between the first position and the second positions following activation and hermetic sealing of the getter.

2. The getter assembly according to claim 1, wherein the activation of the getter is accomplished by an activation soak at elevated temperatures.

3. The getter assembly according to claim 1, wherein:
   the second canister is threadably engageable with the first canister, and
   a turn of the second canister about the first canister drives movement of the internal can from the first position to the second positions.

4. The getter assembly according to claim 1, wherein the internal can comprises:
a base;
an inner wall that extends from the base to be supportive of the getter material; and
a deformable outer wall that extends from the base and comprises a distal end secured to the first canister.

5. The getter assembly according to claim 4, wherein the deformable outer wall comprises at least one of bellows and corrugations.

6. The getter assembly according to claim 1, wherein the second canister comprises:
an internally threaded sidewall to engage with exterior threading of the first canister; and
a flange that extends inwardly from the internally threaded sidewall for coupling with the internal can.

7. A getter assembly, comprising:
a first canister having a valve opening;
an internal can comprising a valve element, getter, vents and braze alloy,
the internal can being disposable in the first canister to occupy a first position at which the valve element closes the valve opening to be positioned to hermetically seal the getter with the braze alloy melted into the vents and second positions at which the valve element is displaced from the valve opening to expose the getter to an exterior environment via the valve opening; and
a second canister which is coupled with the internal can and engageable with the first canister to drive movements of the internal can between the first position and the second positions following activation of the getter and a melting of the braze alloy into the vents.

8. The getter assembly according to claim 7, wherein:
the activation of the getter is accomplished by an activation soak at elevated temperatures, and
the melting of the braze alloy is accomplished by a brief thermal excursion above a melting point of the braze alloy.

9. The getter assembly according to claim 7, wherein the first canister comprises a copper valve seat at the valve opening.

10. The getter assembly according to claim 7, wherein:
the second canister is threadably engageable with the first canister, and
a turn of the second canister about the first canister drives movement of the internal can from the first position to the second positions.

11. The getter assembly according to claim 7, wherein the internal can comprises:
a base defining the vents;
an inner wall that extends from the base to be supportive of the getter and the valve element; and
a deformable outer wall that extends from the base and comprises a distal end secured to the first canister.

12. The getter assembly according to claim 11, wherein the deformable outer wall comprises stainless steel.

13. The getter assembly according to claim 11, wherein the deformable outer wall comprises at least one of bellows and corrugations.

14. The getter assembly according to claim 7, wherein the valve element comprises a sapphire half-ball lens.

15. The getter assembly according to claim 7, wherein the second canister comprises:
an internally threaded sidewall to engage with exterior threading of the first canister; and
a flange that extends inwardly from the internally threaded sidewall for coupling with the internal can.

16. A dewar comprising a getter assembly according to claim 7 for maintaining a dewar vacuum during an operating lifetime.

* * * * *